J. R. BOTTERILL
INVENTOR

BY Mestern, Ross & Mestern

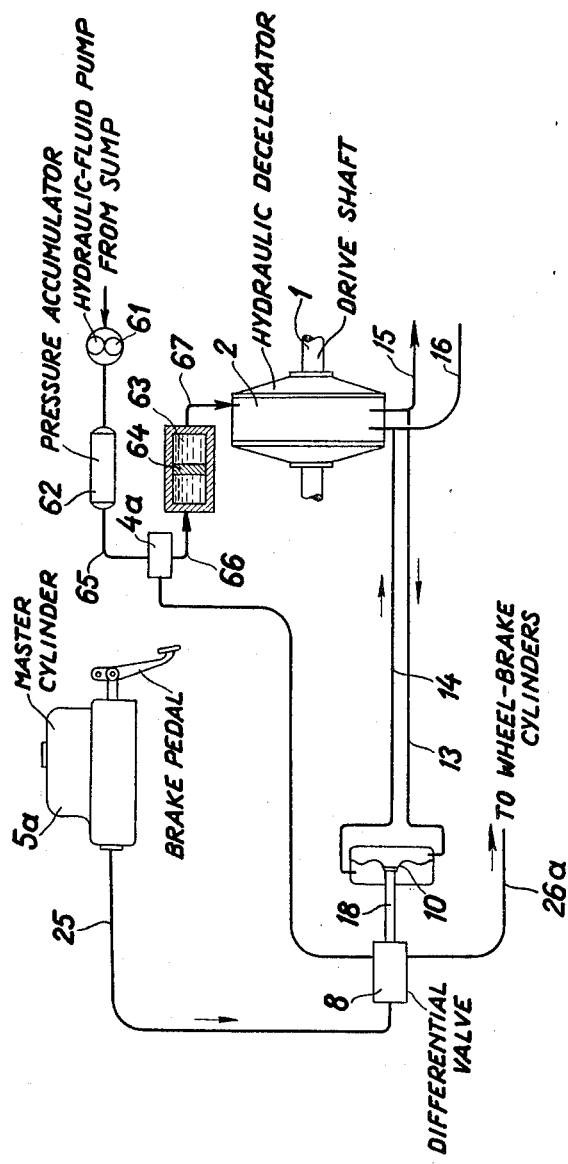

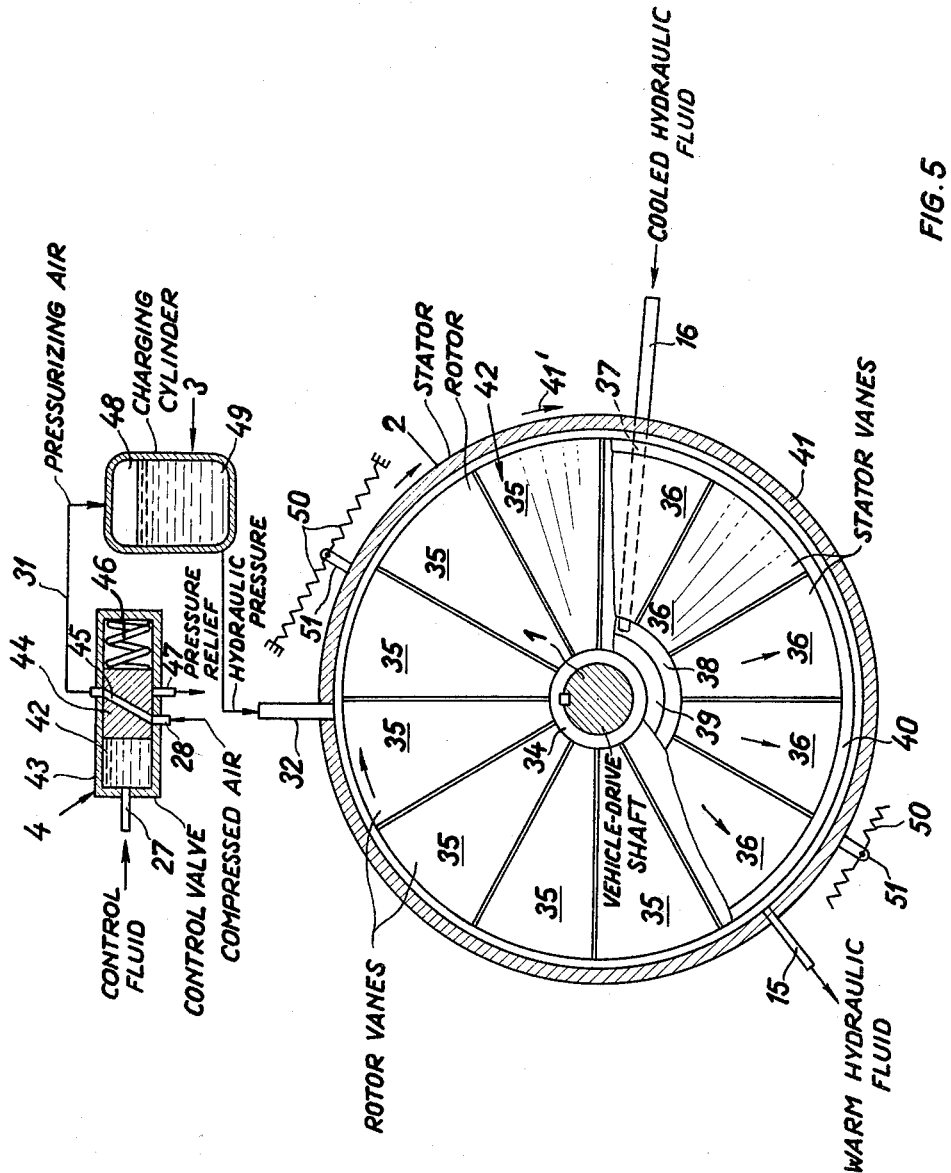

United States Patent Office 3,265,162
Patented August 9, 1966

3,265,162
VEHICLE-BRAKING SYSTEM
John R. Botterill, Frankfurt-Eschersheim, Germany, assignor to Alfred Teves Maschinen- und Armaturenfabrik KG, Frankfurt am Main, Germany
Filed Oct. 9, 1964, Ser. No. 402,970
Claims priority, application Germany, Oct. 11, 1963,
T 24,877
10 Claims. (Cl. 188—86)

The present invention relates to vehicle-braking systems for vehicles having a shaft coupled with the wheels of the vehicle and decelerating means connected to this shaft for augmenting the braking of the vehicle independently of the wheel brakes.

In most automotive vehicles, the braking arrangement includes a plurality of wheel-brake cylinders which are responsive to actuation by fluid under pressure from a main or master cylinder or some other form of fluid-responsive brake-actuating means. Hydraulic or pneumatic fluid is then forced into the wheel cylinders to effect a braking action directly at the wheels. Brake systems of this type are conventional and have been in use for many years. More recently, it has been proposed to augment the wheel brake by means for reducing the speed of the vehicle-drive shaft or some other shaft coupled to the wheels of the vehicle and thus driven by the wheels when the supply of fuel to the engine is reduced and the vehicle is traveling at an elevated speed by virtue of its momentum. Such shaft-braking means are most often employed in heavy vehicles (e.g. trucks, buses and the like) and are particularly useful for downhill braking of the vehicle. One of the most common types of shaft-braking devices can be termed a hydraulic decelerator and has a moving element coupled with the shaft and adapted to effect a pumping action upon a hydraulic fluid. This pumping action requires energy and tends to slow the rotor element and the shaft connected therewith. Such decelerators have been provided heretofore with manually operable actuating levers mounted upon the instrument panel of the vehicle and adapted to cut in the decelerator during downhill travel.

For the purposes of the present disclosure, when reference is made to a hydraulic decelerator it is intended to include all conventional types of decelerators now employed for the purpose intended, although it is preferred if the decelerator is of the known type comprising a rotor with annular cross-section co-operating with an array of radial vanes mounted in the co-operating stator. The housing cover lateral of this rotor has another array of radial vanes. The driven rotor accelerates a hydraulic fluid and displaces it outwardly to the periphery of the rotor, whereupon the fluid passes through the stator. Since a tangential displacement of the fluid is effected by the rotor, the fluid flows around the stator and is passed under pressure to a heat exchanger from which the cooled fluid is returned to the decelerator. The heating of the fluid is a consequence of the pumping action resulting from the relative displacement of the rotor and stator, this pumping action serving to slow the shaft to which the rotor is coupled. The slowing of the shaft by the hydraulic decelerator becomes increasingly inefficient as the speed of the shaft and the vehicle is reduced. Since there is no positive interengagement between the rotor and the stator, moreover, it is impossible for a decelerator of this type to bring the vehicle to a complete standstill. It should be noted that the efficiency of the decelerator is also a function of the hydraulic pressure therewithin since the pumping action is not of the positive-displacement type and is reduced when the hydraulic pressure is low and the supply of fluid is reduced. In conventional systems the wheel brakes may be used to bring the vehicle to a stop after they have, together with the hydraulic decelerator, significantly reduced the vehicle speed. It is a significant disadvantage of such conventional systems, however, that the braking effect of the hydraulic decelerator is independent of that of the wheel-braking system, so that initially the wheel brakes are applied at high vehicle speeds during downhill travel and thus deteriorate although the hydraulic decelerator is substantially more effective at high speeds than are the wheel brakes.

It is the principal object of this invention, therefore, to provide a vehicle-braking system in which a hydraulic decelerator and wheel-braking means are associated but wherein the disadvantages of conventional systems are avoided.

Still another object of my invention is to provide an improved and integrated vehicle-braking system wherein the wheel-braking means and a shaft-decelerating means co-operate to permit the most effective use of the devices.

These objects and others which will become apparent hereinafter are attained, in accordance with the present invention, by the provision of a vehicle-braking system for a vehicle having a shaft coupled with the wheels of the vehicle and fluid-responsive wheel-brake means co-operating with these wheels, the system comprising a hydraulic decelerator of the general character described wherein the decelerating action is initiated upon an increase of hydraulic pressure or fluid volume supplied to the decelerator for decreasing the speed of the shaft; fluid-responsive brake-actuating means coupled with the wheel-brake means for energizing the latter and interconnected with the hydraulic decelerator by suitable control means. The control means of the present invention can include a fluid-operated valve adapted to energize the decelerator directly or via pressure-storage devices, floating-piston arrangements, or pressure accumulators, and provided with a valve piston displaceable in response to an increase in hydraulic pressure, this piston being shiftable upon the application of fluid-pressure to the wheel-brake means. It is thus evident that the actuation of the wheel brake cylinder results in a simultaneous actuation of the valve piston of the fluid-operated valve to bring into play the hydraulic decelerator, thereby eliminating the need for a separate control lever for this decelerator, both braking devices becoming effective simultaneously.

According to a more specific feature of the instant invention, the control means includes a feedback arrangement responsive to the degree of braking of the shaft by the hydraulic decelerator for adjusting the fluid pressure applied to the vehicle-brake means for relieving the pressure in the wheel-brake means when the hydraulic decelerator is at its maximum effectiveness, i.e. at high vehicle speeds. This aspect of the present invention may be accomplished in practice by exploiting the torque applied to the housing or stator of the hydraulic decelerator as the latter increases in braking efficiency. Thus the brake-actuating means of the present invention preferably includes differential-valve means formed with a passage communicating fluid to the wheel-brake means, while the control means includes a mechanism controlled by the decelerator and, advantageously, linked to the stator for selectively blocking the passage and controlling the fluid pressure applied to the wheel brake means in accordance with the degree of braking of the shaft by the decelerator. When, as indicated above, the decelerator includes a rotor entrained by the shaft and an angularly displaceable stator co-operating with the rotor for displacing a hydraulic fluid with pumping action through the decelerator, the torque developed by the stator is generally proportional to the degree of braking of the shaft; the stator can then be coupled directly to a valve body constituting part of the aforementioned mechanism and co-operating with the differential valve means for selectively blocking and unblocking the passage. Since the differential valve means is disposed between the master brake cylinder or air-brake valve and the wheel-brake cylinders, the valve body has the effect of controlling the pressure applied to the wheel-brakes such that the sum of the braking effects of the hydraulic decelerator and the wheel-brake means is substantially constant, regardless of the speed of the vehicle and the degree of braking effected by either the wheel brakes or the decelerator. The significance of this arrangement will become apparent when it is understood that the hydraulic decelerator is most efficient at elevated shaft speeds (high r.p.m.) while the friction-wheel brakes are least effective in this circumstance. At low shaft speeds, the braking effect of the decelerator is reduced to a negligible value whereas the braking efficiency of friction brakes is most effective at low speeds. The system of the present invention thus permits the hydraulic decelerator to take over the major part of a braking action at high speeds and even relieve the wheel brakes.

According to another feature of the present invention, the feedback arrangement makes use of the pressure differential developed in the hydraulic stator, this differential being related to the degree of pumping carried out therewithin and thus to the braking effect of the decelerator. For this purpose, the mechanism mentioned above can include a differentially operable membrane connected to the valve body which co-operates with the differential-valve means. In both cases, the latter can include a seat-forming member shiftable within a valve housing from a normal position in which it is held resiliently and provided with the aforementioned passage. The seat-forming member thus subdivides the interior of the housing into a high-pressure chamber and a low-pressure chamber interconnected by the passage, which can be selectively blocked or unblocked by the valve body affixed to the membrane or connected with the stator. The high-pressure chamber can then communicate with the brake-actuating means while the low-pressure chamber is connected with the fluid-operated valve controlling the action of the decelerator and with the wheel-brake means.

The above and other objects, features and advantages of the present invention will become more readily apparent from the following description, reference being made to the accompanying drawing in which:

FIG. 4 is a view similar to FIG. 1 applying the present invention to brakes operated directly with hydraulic fluid; and FIG. 5 is a cross-sectional view taken through an idealized hydraulic decelerator transverse to the shaft carrying the rotor thereof and serving to illustate the pinciples of the pesent invention.

Figure 1:
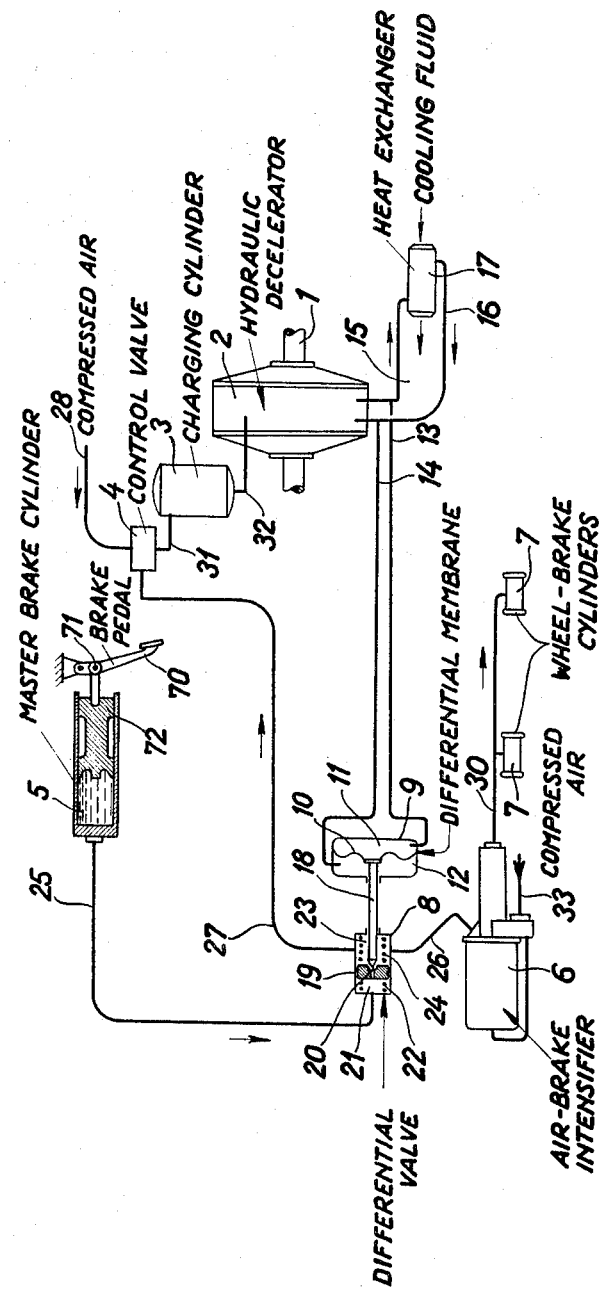
FIG. 1 is a flow diagram of a vehicle-braking system according to the present invention, utilizing air-over-hydraulic wheel-brake actuation.

In FIG. 1 I show a brake system which comprises a brake pedal 70 articulated at 71 to the piston 72 of a master brake cylinder 5 which may be of any conventional type. The vehicle drive shaft 1 carries a hydraulic decelerator 2 as will be described in greater detail with respect to FIG. 5, this decelerator being of any conventional type but preferably having a rotor of annular cross-section co-operating with radial vanes on the stator and cover. The latter are mounted with freedom of limited angular displacement upon the chassis of the vehicle and coaxially surround the rotor carried by shaft 1. The hydraulic decelerator is provided with a charging cylinder or vessel 3 containing hydraulic fluid which is communicating with the decelerator by a hydraulic line 32, the cylinder 3 being pressurized by compressed air passed by a fluid-operated control valve 4. The vehicle-brake system further includes an air-brake intensifier constituted by a conventional air-hydraulic cylinder 6 to which compressed air is fed at 33 and which is energized with hydraulic fluid via the line 26 to pass air-pressurized hydraulic fluid via line 30 to the wheel-brake cylinders 7. The later may operate disk brakes or conventional internal expanding drum-type brakes. The compressed air supplied to the air-hydraulic cylinder via line 33 can enter the latter from a suitable reservoir to which compressed air is fed from the vehicle compressor in a conventional manner. The master cylinder 5 and the air-hydraulic cylinder or intensifier 6 can be of the type described in Principles of Automotive Vehicles, Dept. of the Army Technical Manual TM 9–8000, pages 449, 450 (U.S. Government Printing Office, Washington, D.C., 1956). The system also comprises a differential valve 8 interposed between the master brake cylinder 5, the air-brake intensifier 6 and the fluid-operated control valve 4 as well as a mechanism 9 controlled by the hydraulic decelerator 2 co-operating with the differential valve 8. The brake cylinder 5 can be integral with the differential valve 8 as described and claimed in the commonly assigned copending application Ser. No. 433,032, filed Feb. 10, 1965.

The mechanism 9 constitutes a pressure-responsive means formed with a membrane 10 which subdivides the housing into a pair of compartments 11, 12 respectively, communicating with fluid conduits 13 and 14. These conduits communicate, in turn, with outlet and inlet lines 15, 16 through which hydraulic fluid is pumped by the decelerator 2 as will be apparent hereinafter. The pumped hydraulic fluid is passed through a heat exchanger 17 through which a cooling fluid (e.g. cold air) can be fed by any conventional means including the vehicle fan or some other blower arrangement. The differential membrane 10, which is shiftable in response to the pressure differential between the inlet and outlet of the decelerator 2, is connected with the valve body 18 which extends into the differential valve 8 and is shiftable relatively to the seat-forming member 19 and with respect to the differential-valve housing. Valve-body 18 co-operates with the seat-forming member 19 for selectively blocking and unblocking its passage 20 communicating between the high-pressure chamber 21 and the low-pressure chamber 23 of the differential valve. The seat-forming member 19 is constituted as a piston, displaceable in the direction of displacement of valve body 18, which is normally held in a predetermined position by a pair of compression springs 22, 24 bearing on opposite sides of the valve member 19 and disposed respectively in chambers 21 and 23. A conduit 25 communicates between the master brake cylinder 5 and the high-pressure chamber 21 of the differential valve whose low-pressure member 23 is connected by a line 27 with the control valve 4 and by a line 26 with the air-brake intensifier 6.

Referring now to FIG. 5, it will be seen that the fluid-operated control valve 4 is provided with a housing 43 in which a valve piston 44 is displaceable by hydraulic or pneumatic fluid 42 from line 27. A conduit 28 (see also FIG. 1) supplies compressed air from the vehicle compressor to valve 4, the compressed air passing through valve bore 45 into line 31 when the valve piston 44 is in its extreme right-hand position in which spring 46 is compressed. In the extreme left-hand position of valve piston 44, an outlet port is cleared to permit escape of air from line 31 and effect a pressure relief in the air chamber 48 of the charging cylinder 3 which also contains hydraulic fluid as shown at 49. The hydraulic decelerator 2 illustrated in FIG. 5 is somewhat idealized for simplicity in understanding the principles of the present invention although it must be emphasized that the preferred decelerator is of the type having a rotor with annular cross-section as shown in the above-mentioned copending application. The decelerator may operate under a principle similar to that of the fluid coupling (page 274 of Principles of Automotive Vehicles) with the used "driven member" linked to the chassis and the displaced liquid fed through a heat exchanger. The simplified decelerator of FIG. 5 comprises a stator 41 which encloses a rotor 42, the latter having vanes 35 which, in impeller fashion, lie in planes oblique to the axis of the drive shaft 1 to which the rotor hub 34 is keyed. Oppositely directed vanes 36 are carried by the stator whose hub 39 forms a bearing around the rotor hub 34. An annular compartment 38 is provided between the hub 39 and the stator vanes 36, this compartment being fed with cooled hydraulic fluid from the heat exchanger via a duct 16. The centrifugally displaced hydraulic fluid circulates in an outer annular compartment 40 at the periphery of the rotor and is led off on the increasing pressure through line 15. The pumping action in this device is related to the braking effect and is augmented when the hydraulic pressure within the stator is augmented from the charging cylinder 3 via line 32. The stator 41 can be fixed to the vehicle chassis although it is preferred to permit some freedom of angular movement about the axis of shaft 1 (arrow 41') under the torque-transmitting effect produced by the pumping action. In this case, the stator is shown to be provided with a pair of projections 51 to which springs 50 are anchored, these springs being connected to the chassis of the vehicle and tending to return the stator to its original angular position in spite of partial rotation during braking.

*Operation*

When the brake pedal 70 is slightly depressed, the increased pressure within master cylinder 5 is communicated via line 25 to the high-pressure chamber 21 of the differential valve 8. In the normal position of seat-forming member 19, passage 20 is wide open and hydraulic fluid flows into the low-pressure chamber 23 and thence through conduit 26 to the air-brake intensifier 6. The wheel-brake cylinders are thus energized in the conventional manner. A small volume of hydraulic fluid passes from the low-pressure chamber 23 through line 27 into the control valve 4 and displaces the valve piston 44 to the right to connect conduits 28 and 31 via bore 45. Compressed air then flows into the cylinder 3 and pressurizes the hydraulic fluid therein, this fluid being forced into the decelerator 2 which commences braking action. The pressure differential developed between lines 15 and 16 as a result of the braking action is communicated via conduits 13 and 14 to the differential membrane 10 and shifts the latter together with its valve body 18 with respect to the seat-forming member 19.

In the first phase of the braking operation, the friction brakes engaged by the wheel cylinder 7 are effective until the hydraulic decelerator is brought into play. When the braking action of the decelerator is most effective, a large pressure differential displaces the valve body 18 to the left and blocks the bore 20 while simultaneously moving the seat-forming member to the left (FIG. 1) to expand the low-pressure chamber 23 and relieves the hydraulic pressure in cylinder 7 of the friction brakes. When the vehicle is slowed sufficiently to render the decelerator less efficient, the pressure in chambers 11 and 12 on opposite sides of the differential membrane 10 equalizes and the valve body 18 is drawn to the right whereupon the pressure in chamber 21 shifts the seat-forming member 19 to the right and forces hydraulic fluid through the newly opened passage 20 into the air brake intensifier 6. Concurrently, control valve 4 is further actuated although additional charging of the decelerator 2 is ineffective at the reduced speed of the vehicle. Consequently, the principal braking effort is applied by the wheel-brake cylinders to their respective friction brakes with a pressure determined by the force applied to the brake pedal 70. The pressure differential across the conduits 13, 14 is progressively reduced in step with the reduction of the speed of shaft 1, so that eventually the differential valve 8 is again wide open although the hydraulic pressure in chambers 21 and 24 has been raised. It is evident, therefore, that the braking force or effectiveness of the wheel brakes has replaced the reduction and corresponds to the reduction in the braking force previously applied by the decelerator to the shaft.

Figure 2:
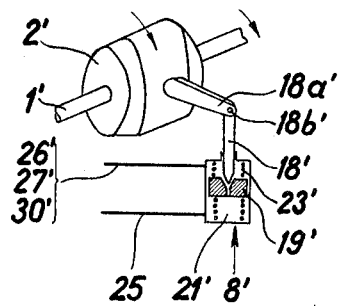
FIG. 2 is a perspective view showing diagrammatically the mechanism whereby the decelerator can control the differential valve in a system otherwise similar to that of FIG. 1.
Figure 3:
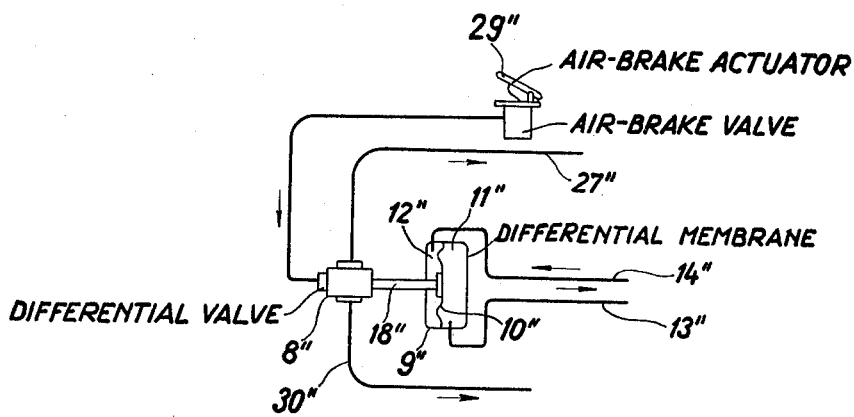
FIG. 3 is a view similar to FIG. 1 of a fragment of a vehicle-braking system according to this invention using air brakes.

In FIG. 2, I show a system wherein the torque developed by the stator of hydraulic decelerator 2' is exploited by a mechanical coupling to control the valve body 18'. As will be evident from FIG. 5, the co-operating vanes on the rotor and stator of the hydraulic decelerator impart a torque to the stator during the pumping action and tends to twist the stator about the axis of shaft 1 against the force of springs 50. A stator of this type is, in the system of FIG. 3, provided with an arm 18a' which is pivoted at 18b' to the valve body 18'; the latter co-operates with the seat-forming member 19' of differential valve 8' to control the flow of fluid from high-pressure chamber 21' to low-pressure chamber 23' as previously described with reference to differential valve 8. A conduit designated by the reference numerals 26', 27' and 30' serves to represent the lines connecting the low-pressure chamber 23' with the brake-force intensifier, the decelerator control valve and the wheel brakes, respectively, as previously described with respect to FIG. 1. The mechanical linkage of FIG. 2 can be directly substituted for the differential control of valve 8 in FIG. 1.

In the modification of FIG. 3, I show how the invention can be applied to an air-brake system of conventional type, e.g. as described on pages 440–448 of Principles of Automotive Vehicles. As in conventional air-brake systems, the air-brake actuator 29″ operates the brake valve which can be supplied with compressed air from a suitable reservoir. From the air-brake valve the compressed air passes into a differential valve 8″ similar to that shown at 8 in FIG. 1 from which it can be directed via line 30″ to the relay valves and/or the wheel-brake chambers or cylinders. Line 27″ is provided to communicate the compressed air to the decelerator control valve which is of the type illustrated at 4 of FIG. 1 although the hydraulic supply line is replaced by an air line. It is also contemplated in accordance with the present invention to have the air line 27″ feed the charging cylinder 3 directly instead of via a valve such as that shown at 4. In the embodiment of FIG. 3, the hydraulic differential developed by the decelerator is communicated by lines 13″ and 14″ to the chambers 11″, 12″ of the mechanism 9″ having a membrane 10″ coupled with the valve body 18″. The operation of the valve body and its co-operation with the differential valve is identical with that previously described with reference to FIG. 1.

In FIG. 4, I show a braking system generally similar to that previously described but completely hydraulic in operation. The system of FIG. 4 differs from that of FIG. 1 in that the compressed air used to actuate the hydraulic decelerator is replaced by pressurized liquid. Thus, a pump 61 can draw hydraulic fluid from a sump (not shown) and feed it to a conventional pressure accumulator 62 while force-storing means applies pressure to the liquid. The force-storing means may be a spring-loaded piston, an air chamber or gas space separated from the liquid by a flexible diaphragm. The pressure accumulator permits instantaneous activation of the decelerator 2 in spite of the fact that the volume-rate of flow from pump 61 may be insufficient at any instant to operate the decelerator. From the pressure accumulator, the fluid passes by a line 65, 66 into a cylinder 63 containing a floating piston 64 under the control of a fluid-operated valve 4a. The latter can be identical to valve 4 except that the pressure relief port of the latter will be connected to the sump. The floating piston 64 maintains the volume of the fluid of the decelerator at the predetermined level. In this embodiment the master cylinder 5a, pressure-supply line 25, differential valve 8, valve body 18 and membrane 10 have the same functions as set forth in FIG. 1 with the pressure differential being applied to the membrane via line 13, 15 and 14, 16. Line 26a feeds the wheel cylinder 7 directly.

The invention described and illustrated is believed to admit of many modifications within the ability of persons skilled in the art, all such modifications being considered within the spirit and scope of the appended claims.

I claim:

1. In a vehicle-braking system for a vehicle having a shaft coupled with wheels of the vehicle and fluid-responsive wheel-brake means, in combination:
   a hydraulic decelerator coupled to said shaft and operable upon an increase of hydraulic pressure applied to said decelerator for reducing the speed of said shaft;
   fluid-responsive brake-actuating means coupled with said wheel-brake means for energizing same, said brake-actuating means including:
   differential-valve means formed with a passage communicating fluid to said wheel-brake means, and
   mechanism controlled by said decelerator for selectively blocking said passage to control the fluid pressure applied to said wheel-brake means in accordance with the degree of braking of said shaft by said decelerator; and
   control means operatively interconnecting said hydraulic decelerator and said brake-actuating means for increasing the hydraulic pressure applied to said decelerator upon operation of said brake-actuating means to energize said wheel-brake means, said differential-valve means comprises a valve housing, a seat-forming member in said housing shiftable under the action of a fluid-pressure differential applied thereacross, said seat-forming member being provided with said passage and subdividing the interior of said housing into a high-pressure chamber and a low-pressure chamber interconnected by said passage, spring means in said housing biasing said seat-forming member into a predetermined normal position and resisting displacement of said seat-forming member in opposite directions out of said position, said high-pressure chamber communicating with said brake-actuating means for pressurization thereby to energize said wheel-brake means, said low-pressure chamber communicating with said wheel-brake means for communicating thereto fluid applied to said differential-valve means by said brake-actuating means.

2. The combination defined in claim 1 wherein said decelerator includes a rotor entrained by said shaft and a stator co-operating with said rotor for displacing a hydraulic fluid through said decelerator, thereby braking the rotation of said shaft, said stator at least limitedly angularly displaceable about the axis of said shaft with a torque generally proportional to the degree of braking thereof by said decelerator, said mechanism including a valve body co-operating with said differential-valve means and operatively connected to said stator for selectively blocking and unblocking said passage.

3. The combination defined in claim 1 wherein said decelerator has an inlet and an outlet for hydraulic fluid and is provided with means for displacing hydraulic fluid from said inlet to said outlet whereby a hydraulic-pressure differential is established between said inlet and said outlet proportional to the degree of braking of said shaft by said decelerator, said mechanism including a valve body co-operating with said differential-valve means and shiftable in response to said hydraulic-pressure differential for selectively blocking and unblocking said passage.

4. The combination defined in claim 3 wherein said mechanism includes a membrane connected with said body and displaceable upon the application of said hydraulic-pressure differential across said membrane, and housing means defining with said membrane a pair of compartments on opposite sides thereof, said mechanism further comprising first and second conduits respectively establishing communication between respective ones of said compartments and said inlet and said outlet.

5. The combination defined in claim 1 wherein said mechanism includes a valve body extending into said housing and co-operating with said seat-forming member for selectively blocking and unblocking said passage, said valve body being displaceable within said housing in the direction of displacement of said seat-forming member and being operatively connected with said decelerator whereby said valve body is positioned with respect to said seat-forming member in response to the degree of braking of said shaft by said decelerator.

6. The combination defined in claim 5 wherein said control means includes a fluid-operated valve connected to said decelerator for selectively increasing the hydraulic pressure applied thereto, said fluid-operated valve communicating with said low-pressure chamber for operation upon the increase of pressure within said low-pressure chamber to permit said fluid-operated valve to increase the hydraulic pressure applied to said decelerator.

7. The combination defined in claim 6 wherein said fluid-operated valve has a hydraulically-controlled valve piston shiftable in response to pressure in said low-pressure chamber, said fluid-operated valve further comprising at least one valve port adapted to be opened and closed by said valve piston for permitting the passage and blocking the flow of compresed air through said fluid-operated valve, said decelerator further comprising a hydraulic-fluid-containing pressurizing vessel connected with said fluid-operated valve for charging with compressed air to drive hydraulic fluid under pressure into said decelerator.

8. The combination defined in claim 6 wherein said brake-actuating means includes an air-brake valve and said wheel-brake means is energizable by compressed air, said fluid-operated valve being actuated by compressed air.

9. The combination as defined in claim 6 wherein said wheel-brake means includes an air-over-hydraulic brake system having air-pressurized hydraulic wheel brakes, said system including an air-hydraulic cylinder connected to said wheel brakes and communicating with said low-pressure chamber to pressurize with air the hydraulic fluid applied to said wheel brakes upon an increase in pressure within the said low-pressure chamber.

10. The combination defined in claim 6 wherein said wheel-brake means includes a plurality of wheel-brake cylinders, said low-pressure chamber communicating directly with said wheel-brake cylinders.

References Cited by the Examiner

UNITED STATES PATENTS 3,167,158   11/1965   Brownyer _____ 188—152

FOREIGN PATENTS 678,102   7/1939   Germany.
682,977   10/1939   Germany.
1,205,023   10/1959   France.

MILTON BUCHLER, *Primary Examiner.*

G. E. A. HALVOSA, *Assistant Examiner.*